Oct. 13, 1964  L. J. DERHAM  3,152,864
PRODUCTION OF ALUMINIUM CHLORIDE
Filed Feb. 25, 1963
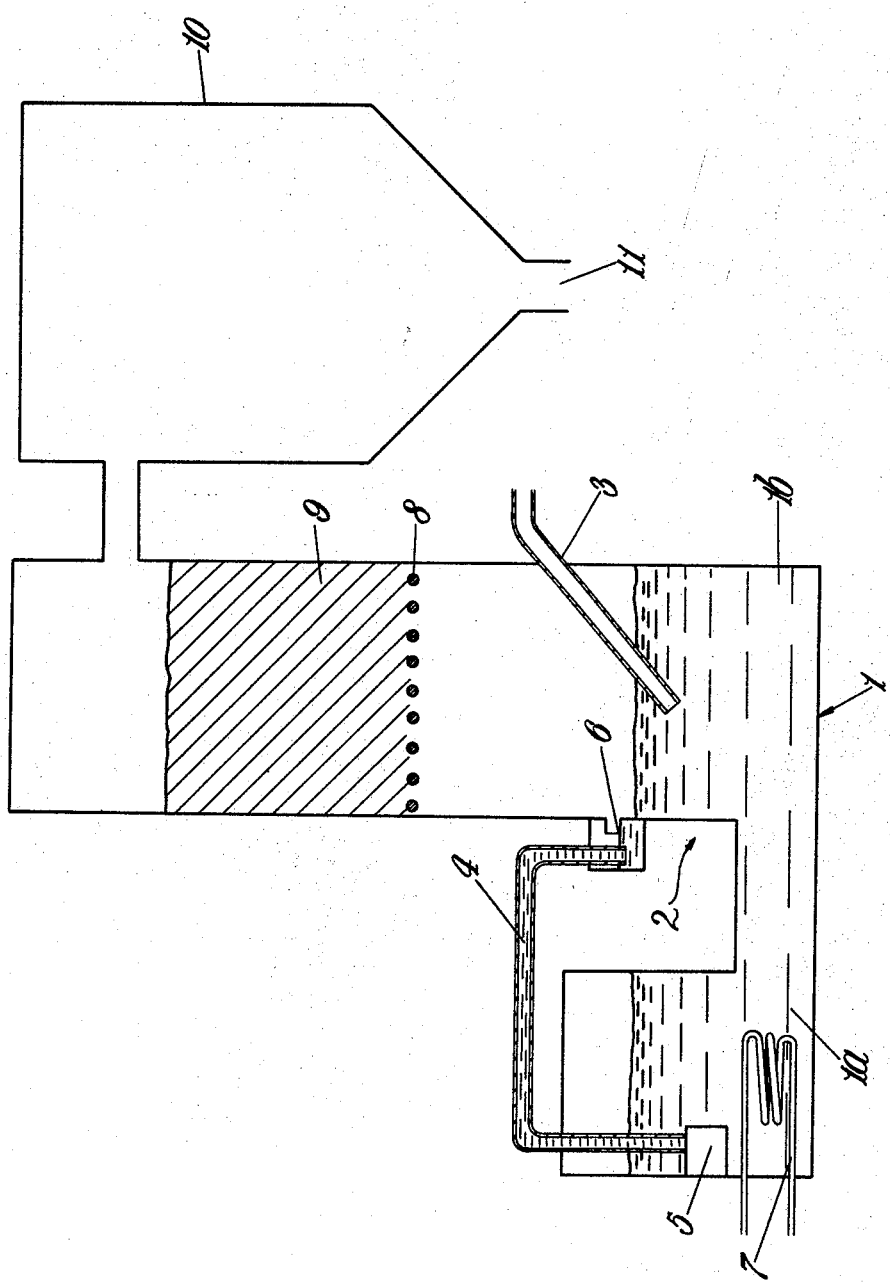

United States Patent Office 3,152,864
Patented Oct. 13, 1964

3,152,864
PRODUCTION OF ALUMINIUM CHLORIDE
Leslie Jack Derham, Avonmouth, England, assignor to The National Smelting Company Limited, London, England
Filed Feb. 25, 1963, Ser. No. 260,616
Claims priority, application Great Britain, Mar. 7, 1962, 8,807/62
2 Claims. (Cl. 23—93)

This invention relates to the production of anhydrous aluminium chloride either in vapour form or solid form and to apparatus therefor.

The invention consists of a method of preparing anhydrous aluminium chloride in which chlorine gas is passed through a molten zinc-aluminium alloy. If the solid is desired, the aluminium chloride vapour thus produced is condensed. This reaction is preferably carried out between 430° C. and 500° C.

Preferably the aluminium chloride vapour is passed through a layer of pieces of aluminium, e.g., before condensation, to exclude chlorine from the vapour or solid product.

The invention further consists of apparatus for carrying out the method comprising a corrosion-resistant vessel or vessel portion supplying zinc-aluminium alloy and a second corrosion-resistant vessel or vessel portion connected to receive a circulating flow of alloy from the first and having a connection for feeding chlorine into the alloy contained therein. If the solid product is required a further corrosion-resistant vessel is connected to receive the aluminium chloride produced and to condense it.

In a modification of the invention, the invention consists in apparatus for preparing anhydrous aluminium chloride comprising: a two-part corrosion-resistant vessel for containing molten zinc-aluminium allow having a dividing wall formed as an underflow baffle; a pipe extending from beneath the alloy surface in a first part of the vessel and to the vicinity of the alloy surface in a second part of the vessel when the apparatus is in use and capable of conveying molten alloy from the first to the second part of the vessel and a connection for feeding chlorine into the alloy contained in the second part. A second vessel may be provided to receive the aluminium chloride produced and to condense it if the solid product is required. The first part of the reaction vessel may be provided with water-cooling means.

The invention still further consists in aluminium chloride whether as a vapour or in solid form, when prepared by the method or in the apparatus according to the invention.

The method and apparatus according to the invention may be described with reference to the accompanying drawings the single figure of which is a section through a suitable form of apparatus.

The apparatus shown consists of a vessel 1 provided with underflow baffle 2 which divides it into two parts 1a and 1b. A chlorine inlet pipe 3 protrudes into part 1b. A further pipe 4 fitted with pump 5 extends from a position near the bottom of part 1a through the baffle 2 and via gate 6 leads into part 1b.

Water-cooling coils 7 are provided in part 1a to take up the heat of reaction, as described below.

Above the chlorine inlet pipe 3, in an extension of vessel 1, is a steel grating 8, upon which a bed of granulated aluminium 9 is provided. The space above this bed, if solid aluminium chloride is required, is connected to a condensing vessel 10 with an outlet 11 at the bottom. When operation is commenced, a zinc-aluminium alloy is added to vessel 1 and initially heated to 430° C.–500° C.

As the metal circulates in part 1b of the vessel chlorine gas is introduced through a chlorine inlet pipe 3 below the surface of the alloy. The heat of formation of aluminium chloride is sufficient to maintain the necessary temperature during operation, so no further heating is required, in fact cooling coils 7, sixteen are provided so that the alloy circulating to part 1a of the vessel (by virtue of the circulation induced by pump 5 pumping alloy through pipe 4 and gate 6) can be kept within the above temperature limits. To prevent condensation of aluminium chloride in part 1b of vessel the temperature at the top of the vessel is maintained slightly above 200° C. The condensing vessel 10 is maintained at a temperature of from 40° C. to 50° C. and aluminium chloride powder of 99% purity is collected from the outlet 11 in a suitable container such as a polythene bag.

However, if the aluminium chloride is required in massive or crystalline form, then a further stage is required in which the powder is heated, for example, 190° C. at 2.5 atmospheres' pressure, and then allowed to solidify. Alternatively, a high purity product may be obtained by sublimation in a suitable apparatus to produce massive crystals.

In some manufactures, e.g., the manufacture of titanium oxide-based pigment, vapourized $AlCl_3$ can advantageously be used, e.g., for mixing with the $TiCl_4$ being hydrolyzed. If this vapourized $AlCl_3$ is required it may be drawn off at A. Vapourized $AlCl_3$ may also be used for vapour phase catalysis.

Excess chlorine gas must on no account pass from vessel 2 to condenser 4. To guard against this, the $AlCl_3$ vapour produced in part 1b of vessel 1 is made to pass upwardly through the bed of granulated aluminium resting on the steel grating 8. In this way any chlorine in the vapour attacks the granulated aluminium and is converted to aluminium chloride.

As the operation proceeds, a further aluminium is added to vessel 1 in the form of scrap aluminium, or an alloy containing aluminium and zinc. Scrap aluminium usually contains impurities such as iron, silicon and copper. When such scrap aluminium is used as a feed to vessel 1, the iron and silicon separate out and form a dross on the surface which may be removed. Some copper, however, remains in solution and may circulate to chlorinating portion 1b but it has no interfering effect. Thus no harmful impurities are allowed to pass into portion 1b since circulation between the two portions of vessel 1 is effected through pipe 4 which is fed from near the bottom of the vessel. The invention thus provides a rapid efficient method of producing high purity aluminium chloride from scrap aluminium or an alloy containing aluminium and zinc. The zinc acts as a vehicle to hold the aluminium and thereby enables the reaction to be carried out at a lower temperature than if aluminium alone were used, thus making it possible to use steel equipment throughout.

The ratio of zinc to aluminium in the alloy in vessel 1 is not critical although a working ratio might be about 9:1.

It is a logical extension of this process to charge to vessel 1 a scrap alloy containing, for example, 95–96% zinc, 4% aluminium and a little copper, for example, scrap Mazak (Mazak is a registered trade mark), instead of feeding scrap aluminium to a melt of zinc to give the required range of working ratios of Zn:Al. Thus, it follows that a further advantage may accrue from our process, namely that operating the apparatus on a feed of scrap Mazak, a good yield of aluminium chloride may be produced and, in addition, the removal of the aluminium from the alloy as $AlCl_3$ will produce a grade of zinc metal remaining in the reaction vessel of equivalent to G.O.B. grade, assaying 98–98.5 Zn.

I claim:

1. A method of preparing anhydrous aluminium chloride which comprises: retaining a molten zinc-aluminium alloy at a temperature of from 430° C. to 500° C. in a vessel divided into two portions by an underflow baffle; passing chlorine gas into one portion of the vessel to form aluminium chloride vapour; allowing said aluminium chloride vapour to pass upwards through a layer of pieces of aluminium to rid it of traces of free chlorine, cooling the molten zinc-aluminium alloy in the other portion of the vessel and passing the molten alloy thus cooled into the first portion of the vessel for further reaction with chlorine vapour at a temperature of between 430° C. and 500° C., thereby causing the warmer molten alloy thus formed to pass back beneath the underflow baffle to be cooled.

2. A method as claimed in claim 1, in which the aluminium chloride vapour which has been purified by contact with the layer of pieces of aluminium is condensed to solid aluminium chloride.

References Cited in the file of this patent

UNITED STATES PATENTS

| | | |
|---|---|---|
| 877,243 | Sperry | Jan. 21, 1908 |
| 1,165,065 | Brooks | Dec. 21, 1915 |
| 1,269,236 | Weaver | June 11, 1918 |
| 1,455,005 | Kirkpatrick et al. | May 15, 1923 |
| 1,468,632 | Hall | Sept. 25, 1923 |
| 1,641,503 | Prichard et al. | Sept. 6, 1927 |
| 1,645,143 | Humphrey et al. | Oct. 11, 1927 |
| 2,848,455 | Pardee | July 15, 1958 |